US008027936B2

(12) United States Patent
Ito

(10) Patent No.: US 8,027,936 B2
(45) Date of Patent: Sep. 27, 2011

(54) APPARATUS FOR AND METHOD OF ESTABLISHING DIGITAL CONTENT RIGHT, AND COMPUTER PROGRAM PRODUCT

(75) Inventor: Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1305 days.

(21) Appl. No.: 11/071,172

(22) Filed: Mar. 4, 2005

(65) Prior Publication Data

US 2006/0004669 A1 Jan. 5, 2006

(30) Foreign Application Priority Data

Jul. 5, 2004 (JP) ................................ 2004-198191

(51) Int. Cl.
*G06F 21/00* (2006.01)

(52) U.S. Cl. .............. 705/904; 705/51; 705/57; 705/58; 705/59; 705/901; 705/902; 705/903; 705/905; 705/906; 705/907; 705/908; 705/909; 705/910; 705/911; 705/912; 380/227; 380/228; 380/229; 380/230

(58) Field of Classification Search .............. 705/50–79, 705/901–912

See application file for complete search history.

(56) References Cited

U.S. PATENT DOCUMENTS

| 7,320,140 | B1 * | 1/2008 | Boyer et al. ................ 726/6 |
| 2003/0125976 | A1 * | 7/2003 | Nguyen et al. ............. 705/1 |
| 2003/0140003 | A1 * | 7/2003 | Wang et al. ................ 705/39 |

FOREIGN PATENT DOCUMENTS

| JP | 2001-290780 | | 10/2001 |
| JP | 2002-176549 | | 6/2002 |
| JP | 2004-13493 | | 1/2004 |
| JP | 2004050480 | * | 2/2004 |

OTHER PUBLICATIONS

Information Technology—Multimedia Framework (MPEG-21), Part 5: Rights Expression Language, ISO/IEC 21000-5, First Edition, Apr. 1, 2004, pp. 1-121. Retrieved from IDS.*
Information Technology—Multimedia Framework (MPEG-21), Part 5: Rights Expression Language, ISO/IEC 21000-5, First Edition, Apr. 1, 2004, pp. 1-121.
U.S. Appl. No. 11/965,363, filed Dec. 27, 2007, Ito.
U.S. Appl. No. 11/075,426, filed Mar. 9, 2005, Ito et al.
U.S. Appl. No. 11/076,538, filed Mar. 10, 2005, Ito et al.
Akiko Seki, et al., "Distributed Rights Circulation and Processing System Enabling Re-composition of Rights-condition and Preserving Derivation of Rights-relation" IPSJ SIG Technical Report, , Nov. 29, 2003, 11 Pages (w/Partial English Translation).

* cited by examiner

*Primary Examiner* — James A Reagan
(74) *Attorney, Agent, or Firm* — Oblon, Spivak, McClelland, Maier & Neustadt, L.L.P.

(57) ABSTRACT

An apparatus for generating copyright information for a secondarily processed content obtained by performing secondary processing on an original content, includes a secondary processed substance acquiring unit, a default license information generating unit, and a license information editing unit. The secondary processed substance acquiring unit acquires operation substances of the secondary processing performed on the original content. The default license information generating unit obtains rights expressions for the operation substances acquired by the secondary processed substance acquiring unit to generate default license information including the rights expressions as an initial value. The license information editing unit accepts selection of a desired rights expression by a user from the rights expressions of the default license information generated by the default license information generating unit to generate license information of the secondarily processed content from the selected rights expression.

12 Claims, 19 Drawing Sheets

FIG.4A

| IDENTIFICATION CODE | PARENT CODE | OPERATION SUBSTANCE NAME |
|---|---|---|
| R1 | - | PRESENT-STATUS USE |
| R11 | R1 | COPY |
| R111 | R11 | DIGITAL COPY |
| R112 | R11 | PRINT |
| R12 | R1 | PUBLIC TRANSMISSION |
| R121 | R12 | BROADCASTING |
| R122 | R12 | SERVER UPLOAD |
| R123 | R12 | MAIL ATTACHMENT |
| R2 | - | QUOTATION |
| R3 | - | SECONDARY PROCESSING |
| R31 | R3 | TRANSLATION |
| R32 | R3 | ARRANGEMENT |
| R33 | R3 | MODIFICATION |
| R331 | R33 | INSERTION OF GRAPHIC AND TEXT |
| R332 | R33 | FORMATION OF 3D IMAGE |
| R34 | R3 | ADAPTATION |
| R341 | R34 | SUMMARY |
| R342 | R34 | MAKING CARTOONISH |
| R343 | R34 | MODIFICATION FOR CHILDREN'S BOOK |
| R35 | R3 | FORMATION OF METADATA |
| R351 | R35 | INFORMATION OF EXTERNAL LINKED DESTINATION (URI) |
| R352 | R35 | DATA FOR RETRIEVAL (INDEX/ CHARACTERISTIC AMOUNT) |
| R353 | R35 | USE LOG DATA |

FIG.4B

USE RIGHT
- R1: PRESENT-STATUS USE
  - R11: COPY
    - R111: DIGITAL COPY
    - R112: PRINT
  - R12: PUBLIC TRANSMISSION
    - R121: BROADCASTING
    - R122: SERVER UPLOAD
    - R123: MAIL ATTACHMENT
- R2: QUOTATION
- R3: SECONDARY PROCESSING
  - R31: TRANSLATION
  - R32: ARRANGEMENT
  - R33: MODIFICATION
    - R331: INSERTION OF GRAPHIC AND TEXT
    - R332: FORMATION OF 3D IMAGE
  - R34: ADAPTATION
    - R341: SUMMARY
    - R342: MAKING CARTOONISH
    - R343: MODIFICATION FOR CHILDREN'S BOOK
  - R35: FORMATION OF METADATA
    - R351: INFORMATION OF EXTERNAL LINKED DESTINATION (URI)
    - R352: DATA FOR RETRIEVAL (INDEX/CHARACTERISTIC AMOUNT)
    - R353: USE LOG DATA

FIG.4C

| IDENTIFICATION CODE | NAME | TYPE | ELEMENT1 | TYPE | ELEMENT2 | TYPE |
|---|---|---|---|---|---|---|
| C1 | USER DESIGNATION | - | - | - | - | - |
| C11 | mailling-list | Set[0,?] (String) | - | - | - | - |
| C12 | UserID | Set[0,?] (String) | - | - | - | - |
| C13 | Location | Set[0,?] (String) | - | - | - | - |
| C14 | Domain | Set[0,?] (String) | - | - | - | - |
| C15 | hostID | Set[0,?] (String) | - | - | - | - |
| C2 | DURATION DESIGNATION | - | - | - | - | - |
| C21 | Duration | Struct | Length | Interger | Unit | String |
| C22 | Date | Struct | After | Date | Before | Date |
| C23 | Times | Int | - | - | - | - |
| C3 | PURPOSE OF USE | String | - | - | - | - |
| C4 | NAME DISPLAY METHOD | Set[1,?] (Struct) | Title | String | Appearance | String |
| C5 | FEE | Struct | price | Real | currency | String |

FIG.4D

USE CONDITION
- C1: USER DESIGNATION
  - C11 : mailing-list
  - C12 : UserID
  - C13 : Location
  - C14 : Domain
  - C15 : hostID
- C2: DURATION DESIGNATION
  - C21 : Duration
  - C22 : Date
  - C23 : Times
- C3: PURPOSE OF USE
- C4: NAME DISPLAY METHOD
- C5: FEE

FIG.5

| | R1 | R11 | R111 | R112 | R12 | R121 | R122 | R123 | R2 | R3 | R31 | R32 | R33 | R331 | R332 | R34 | R341 | R342 | R343 | R35 | R351 | R352 | R353 |
|---|---|---|---|---|---|---|---|---|---|---|---|---|---|---|---|---|---|---|---|---|---|---|---|
| PRESENT-STATUS USE — R1 | F | F | F | F | F | F | F | F | F | F | F | F | F | F | F | F | F | F | F | F | F | F | F |
| PHYSICAL COPY — R11 | | F | F | F | | | | | | | | | | | | | | | | | | | |
| DIGITAL COPY — R111 | | | F | | | | | | | | | | | | | | | | | | | | |
| PRINT — R112 | | | | F | | | | | | | | | | | | | | | | | | | |
| PUBLIC TRANSMISSION — R12 | | | | | F | F | F | F | | | | | | | | | | | | | | | |
| BROADCASTING — R121 | | | | | | F | | | | | | | | | | | | | | | | | |
| SERVER UPLOAD — R122 | | | | | | | F | | | | | | | | | | | | | | | | |
| MAIL ATTACHMENT — R123 | | | | | | | | F | | | | | | | | | | | | | | | |
| QUOTATION — R2 | | | | | | | | | F | | | | | | | | | | | | | | |
| SECONDARY PROCESSING — R3 | | | | | | | | | | F | F | F | F | F | F | F | F | F | F | F | F | F | F |
| TRANSLATION — R31 | | | | | | | | | | | F | | | | | | | | | | | | |
| ARRANGEMENT — R32 | | | | | | | | | | | | F | | | | | | | | | | | |
| MODIFICATION — R33 | | | | | | | | | | | | | F | F | F | | | | | | | | |
| INSERTION OF GRAPHIC AND TEXT — R331 | | | | | | | | | | | | | | F | | | | | | | | | |
| FORMATION OF 3D IMAGE — R332 | | | | | | | | | | | | | | | F | | | | | | | | |
| ADAPTATION — R34 | | | | | | | | | | | | | | | | F | F | F | F | | | | |
| SUMMARY — R341 | | | | | | | | | | | | | | | | | F | | | | | | |
| MAKING CARTOONISH — R342 | | | | | | | | | | | | | | | | | | F | | | | | |
| FORMATION OF METADATA — R343 | | | | | | | | | | | | | | | | | | | F | | | | |
| INFORMATION OF EXTERNAL LINKED DESTINATION (URI) — R35 | | | | | | | | | | | | | | | | | | | | F | F | F | F |
| DATA FOR RETRIEVAL (INDEX/CHARACTERISTIC AMOUNT) — R351 | | | | | | | | | | | | | | | | | | | | | F | | |
| ARRANGEMENT — R352 | | | | | | | | | | | | | | | | | | | | | | F | |
| USE LOG DATA — R353 | | | | | | | | | | | | | | | | | | | | | | | F |

501

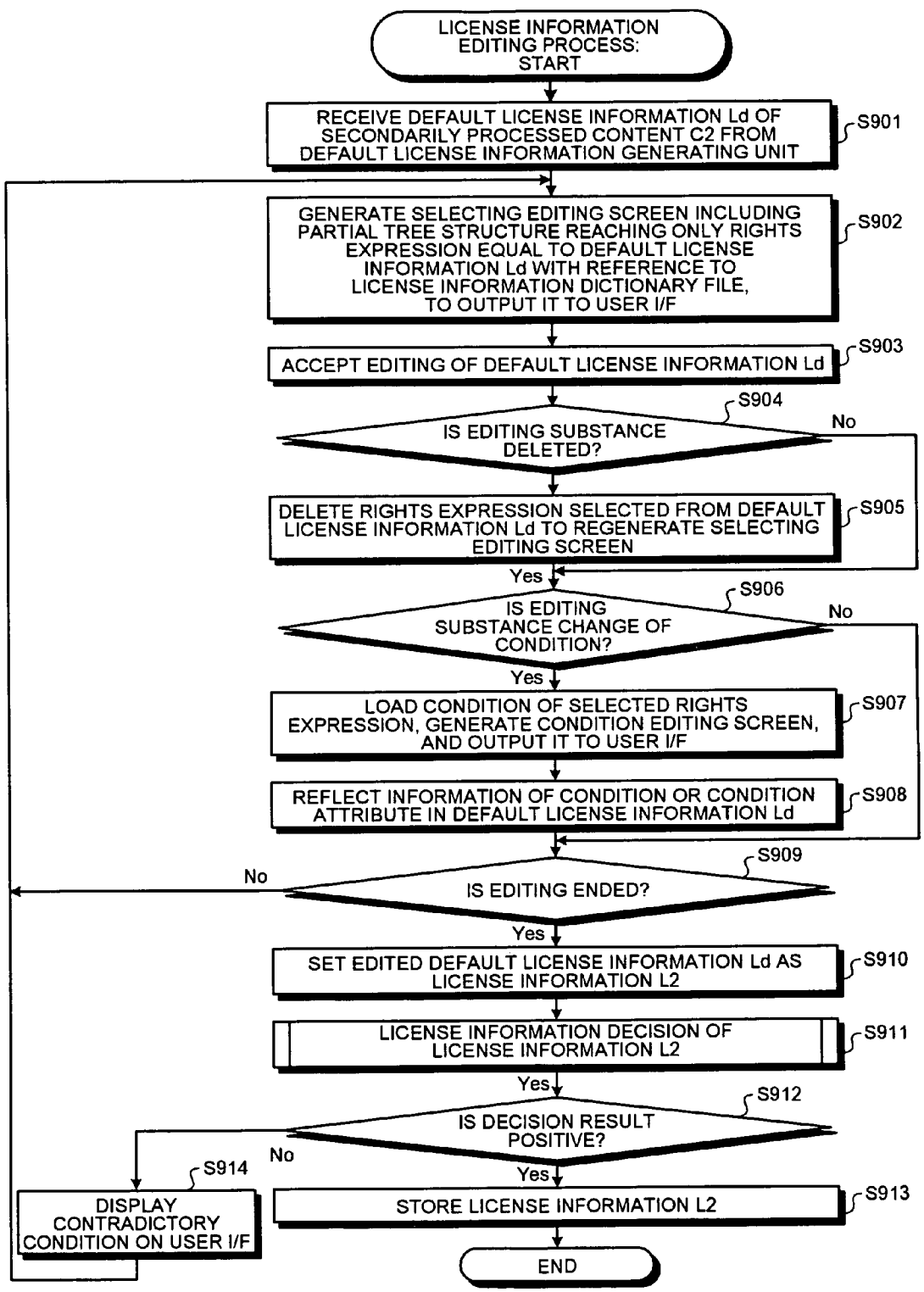

FIG.12

ORIGINAL RIGHT HOLDER : XXXX  ORIGINAL CONTENT ID : ABCD12345

RIGHT
HOLDER : YYYY  CONTENT ID : EDG67890

PERMISSION
├ R1: PRESENT-SITUATION USE  [DELETE]
│ ├ R11: COPY  [DELETE] [CHANGE OF CONDITION]
│ ├ R12: PUBLIC TRANSMISSION  [DELETE] [CHANGE OF CONDITION]
│ └ R123: MAIL ATTACHMENT  [DELETE] [CHANGE OF CONDITION]
├ R3: SECONDARY PROCESSING
│ └ R33: MODIFICATION
│   └ R331: INSERTION OF GRAPHI
       AND TEXT  [DELETE]

▸ R1: PRESENT-SITUATION USE
└ R11: COPY  [DELETE]

USE CONDITION EXPRESSION mailing-list ▸ art-com@x x x x .com   [ADD ELEMENT]
location ▸ JAPAN   [ADD ELEMENT]

NAME DISPLAY METHOD ▸   [ADD ELEMENT]
 Title  Ito(2004)  Appearance  One-Click ▸ ▸
 Title  arrenged by Sato(2005)  Appearance  Below-content ▸

Duration ▸
length  12  unit  MONTH ▸

[ADD CONDITION]  [Undo]   [OK]  [Cancel]

[END・SAVE]

FIG.14A

| PERMITTED OPERATION | R331 | | | | | | |
|---|---|---|---|---|---|---|---|
| NONPERMITTED OPERATION | ¬ R 1 | ¬ R2 | ¬ R31 | ¬ R32 | ¬ R332 | ¬ R34 | ¬ R35 |

FIG.14B

| PERMITTED OPERATION | R111 | R123 | R331 | | | | | | |
|---|---|---|---|---|---|---|---|---|---|
| NONPERMITTED OPERATION | ¬ R112 | ¬ R121 | ¬ R122 | ¬ R2 | ¬ R32 | ¬ R332 | ¬ R35 | ¬ R34 | ¬ R35 |

APPARATUS FOR AND METHOD OF ESTABLISHING DIGITAL CONTENT RIGHT, AND COMPUTER PROGRAM PRODUCT

CROSS-REFERENCE TO RELATED APPLICATIONS

This application is based upon and claims the benefit of priority from the prior Japanese Patent Application No. 2004-198191 filed on Jul. 5, 2004 the entire contents of which are incorporated herein by reference.

BACKGROUND OF THE INVENTION

1) Field of the Invention

The present invention relates to a digital content right establishing apparatus, a digital content right establishing method, and a digital content right establishing program that establish, as copyright information, license information that defines a rights expression of an operation performed when a secondary processing of a digital content.

2) Description of the Related Art

In recent years, a large number of DRMs (Digital Right Management) that are techniques for protecting the copyrights of digital copyrighted works are developed. In particular, commercial digital contents such as movies or musical compositions, as is typified by a DVD, a strong protection for the copyrights is developed advantageously to a content provider.

Since the copyright protecting function in these techniques is strongly demanded to prevent digital contents from being copied, a very rigid and tough mechanism is provided to limit the degree of freedom of users in comparison with analog digital contents.

In copyright lows, regulation for so-called fair use such as copies or quotations for private use is set such that copyrighted works can be used without permission from a copyright holder. However, the degree of freedom of a user is limited to prevent such a digital copyrighted work from being copied. For this reason, the copyrighted work cannot be copied or quoted for private use, and the demand for fair use of a digital copyrighted work has increased.

On the other hand, in the present circumstances, much attention is not given to protections for noncommercial contents such as business documents, product catalogs, personal homepages, and electronic mails the contents of which are ordinarily reused or secondarily processed, and the contents are not safely circulated.

In these circumstances, international standardization operations such as ISO/IEC 21000 (MPEG21) which target circulation and management of digital contents of various forms are advanced. In MPEG21, standardization of REL (Right Expression Language), Right Data Dictionary, and the like based on XrML (extensible right Markup Language). A support method or the like to perform right expression is proposed by U.S. Patent Application Pub. No. US2003/0125976.

On the other hand, the following technique is proposed. That is, when a secondary copyrighted work is created by quoting an original copyrighted work while focusing an expression of right information of the secondary copyrighted work, inheritance of the right is performed by containing copyright information related to the content of a quoted portion in the copyrighted work to protect the right of the original copyright work (for example, see Japanese Patent Application Laid-Open No. 2002-176549).

However, permission for secondary processing of a content, depending on the substance of the secondary processing, must cope with assumptions of various secondary processings such as secondary copyrighted works, works which are no better than only a copy, or copyrighted works used as legal quotations. More specifically, when a secondarily processed content generated by processing corresponds to a secondary copyrighted work under copyright lows, the secondarily processed content has a copyright related to a created document serving as an original content and a new copyright of a creator who performs the secondary processing. However, when the secondarily processed content does not correspond to the secondary copyrighted work, as the copyright to the secondarily processed content, the copyright to the original content is inherited. In this manner, permission for the right of a digital content must assume different cases depending on the types of the secondary processings.

In permission of the right of a digital content, rights expressions, that is, "copy is prohibited" and "addition to mail is permitted" or "copy is prohibited" and "copy of secondary processed work is permitted" have dependence. For this reason, substantial mismatching must be prevented from occurring between the rights expressions serving as substances that cannot be substantially executed. For this reason, as the rights expressions of the digital contents, complex rights expressions must be consequently set.

In addition, when the right of a secondary processed work is to be set, a situation in which a right of permission set by a creator of an original content is substantially invalid must be avoided. For example, the right of permission in which, although the original content is prohibited from being delivered through the Internet, delivery of the secondarily processed content through the Internet is permitted must be avoided to set the right of permission.

In the technique of Japanese Patent Application Laid-Open No. 2002-176549, in a quotation or a copy in which an original content is left intact in a secondarily processed content obtained by secondarily processing the original content, protection for the right of the original content can be performed. However, for example, when a secondarily processed content that is integrated with the original form of an original content and cannot be separated from the original form is formed in the original content without keeping the original form, it must be decided whether the secondarily processed content correspond to a derivative work. For this reason, the copyright of the creator of the original content cannot be easily protected. In the technique of Japanese Patent Application Laid-Open No. 2002-176549, matching with the rights expressions having the dependence cannot be also secured.

In the technique of U.S. Patent Application Pub. No. US2003/0125976, a right can be cyclopaedically expressed as a license obtained by packaging various rights. However, the substantial mismatching of the rights expressions cannot be prevented, and the rights expression of the original content cannot be protected.

SUMMARY OF THE INVENTION

It is an object of the present invention to at least solve the problems in the conventional technology.

An apparatus for generating copyright information for a secondarily processed content obtained by performing secondary processing on an original content, according to one aspect of the present invention, includes a secondary processed substance acquiring unit, a default license information generating unit, and a license information editing unit. The secondary processed substance acquiring unit acquires operation substances of the secondary processing performed on the original content. The default license information generating unit obtains rights expressions for the operation substances acquired by the secondary processed substance acquiring unit to generate default license information including the rights expressions as an initial value. The license information editing unit accepts selection of a desired rights expression by a user from the rights expressions of the default license information generated by the default license information generating unit to generate license information of the secondary processed content from the selected rights expression.

A method of generating copyright information for a secondarily processed content obtained by performing secondary processing on an original content, according to another aspect of the present invention, includes: acquiring operation substances of the secondary processing performed on the original content; obtaining rights expressions for the operation substances to generate default license information including the rights expressions as an initial value; and accepting selection of a desired rights expression by a user from the rights expressions of the default license information to generate license information of the secondary processed content from the selected rights expression.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4A is an explanatory diagram that depicts an example of definition of operation substances registered in the license information dictionary file 108, FIG. 4B is an explanatory diagram visually that depicts the hierarchical structure of operation substances registered in the license information dictionary file 108, FIG. 4C is an explanatory diagram that depicts an example of definition of conditions for the operation substances registered in the license information dictionary file 108, and FIG. 4D is an explanatory diagram visually that depicts the hierarchical structure of the conditions;

FIG. 5 is a diagram of a data structure diagram that depicts an example of substances of the permission verifying rule data file 109;

FIG. 9 is a flow chart that depicts a procedure of the license information editing process;

FIG. 12 is a pattern diagram that depicts an example in which conditions and a parameter unique to the condition are added on the condition editing screen;

FIG. 14A is an explanatory diagram that depicts an example of the rights expression table T, and FIG. 14B is an explanatory diagram that depicts an example of the rights expression table T'.

DETAILED DESCRIPTION

A preferred embodiment of a digital content right establishing apparatus, a digital content right establishing method, and a digital content right establishing program according to the present invention is explained.

When a digital content right establishing apparatus according to the embodiment generates a secondarily processed content C2 obtained by secondarily processing an original content C1, the digital content right establishing apparatus generates license information L2 of a secondarily processed content not to have a range wider than the range of the rights expression of license information L1 of the original content.

Figure 1:
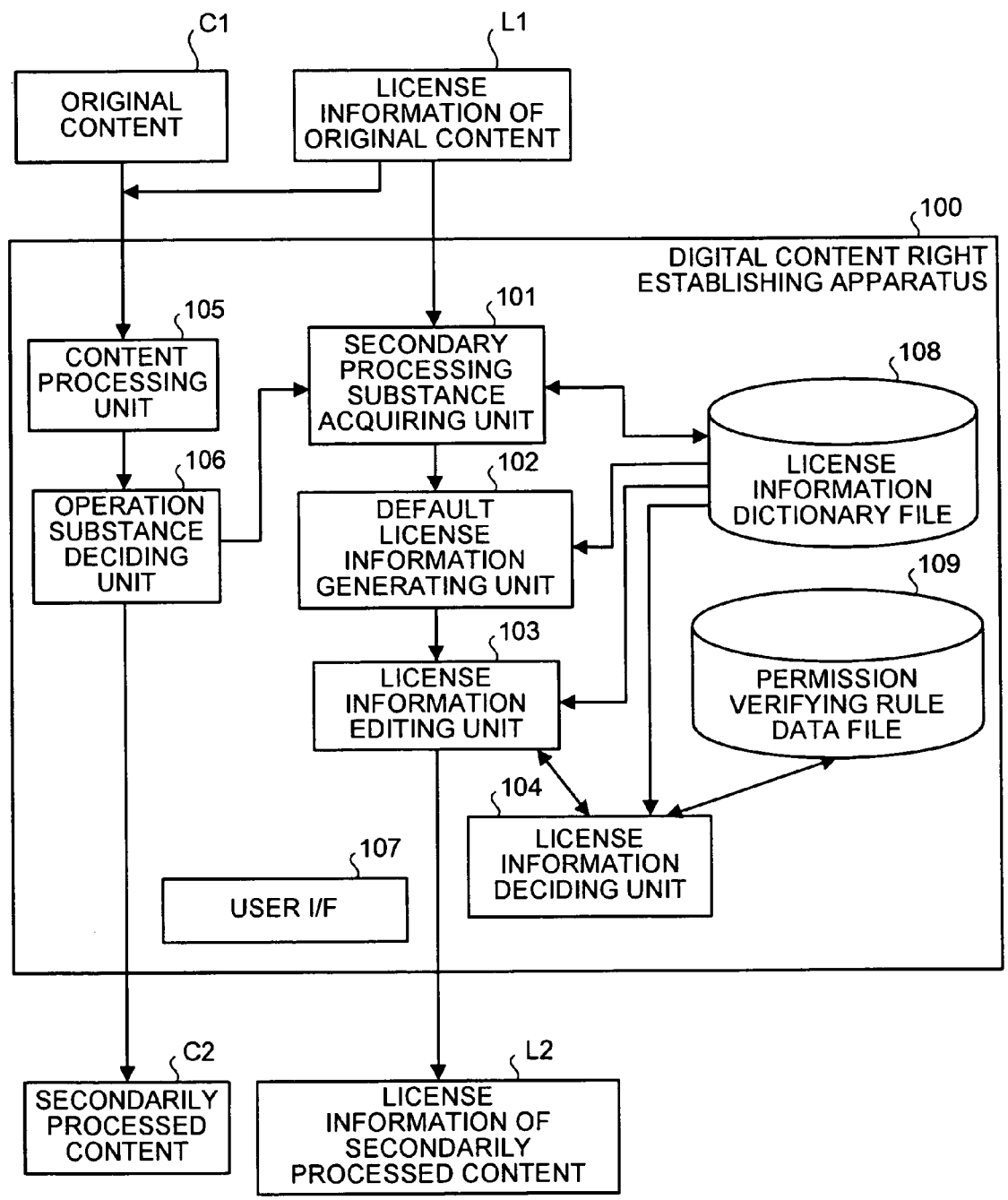
FIG. 1 is a block diagram of the digital content right establishing apparatus according to an embodiment.

FIG. 1 is a block diagram that depicts a functional configuration of the digital content right establishing apparatus according to the embodiment. The digital content right establishing apparatus 100 according to the embodiment, as shown in FIG. 1, includes a secondary processing substance acquiring unit 101, a default license information generating unit 102, a license information editing unit 103, a license information deciding unit 104, a content processing unit 105, an operation substance deciding unit 106, and a user I/F 107. In the digital content right establishing apparatus 100 according to the embodiment, as shown in FIG. 1, a license information dictionary file 108 and a permission verifying rule data file 109 are stored in a hard disk drive (HDD).

In the digital content right establishing apparatus 100 according to the embodiment, the content processing unit 105 and the operation substance deciding unit 106 that perform a secondary processing process for an original content C1 to generate a secondarily processed content C2 and the secondary processing substance acquiring unit 101, the default license information generating unit 102, the license information editing unit 103, and the license information deciding unit 104 that generate license information L2 of the secondarily processed content C2 are operated in cooperation with each other.

The secondary processing substance acquiring unit 101 acquires an operation substance of secondary processing performed to the original content C1 by the content processing unit 105 or an operation substance of secondary processing desired to be performed. As concrete methods of acquiring operation substances, the following methods are used. That is, license information L1 of the original content C1 is loaded, a secondary processing substance selecting screen on which only a rights expression that is equal to a right to adapt the license information L1 is displayed on the user I/F 107 with reference to the license information dictionary file 108, and an operation substance designated by a user is acquired from the secondary processing substance selecting screen. The operation substance is acquired based on a decision result, which is sent from the operation substance deciding unit 106, of an operation substance of secondary processing performed to the original content C1. Furthermore, the decision result sent from the operation substance deciding unit 106 is reflected in the secondary processing substance selecting screen displayed on the user I/F 107 to acquire a operation substance designated by a user from the secondary processing substance selecting screen in which the operation substance of the decision result is reflected.

The default license information generating unit 102 is to generate default license information from the operation substance of the secondary processing acquired by the secondary processing substance acquiring unit 101 based on the license information dictionary file 108. The default license information is license information in which a permission range serving as an initial value of the license information L2 of the secondarily processed content C2. The default license information is further edited to generate the license information L2 of the secondarily processed content. For the default license information, as a range of the rights expression, a range equal to the range of the rights expression of the license information L1 of the original content C1.

The license information editing unit 103 generates a license information editing screen from the default license information generated by the default license information generating unit 102 based on the license information dictionary file 108 and outputs the license information editing screen to the user I/F 107. The license information editing unit 103 accepts selection of a rights expression of a content created by a user from the license information editing screen, edits the default license information with the selected rights expression, and generates the license information L2 of the secondarily processed content C2.

The license information deciding unit 104 verifies an inclusive relation of the rights expressions and matching between the rights expressions with reference to the license information L2 of the secondarily processed content C2, the license information dictionary file 108, and the permission verifying rule data file 109.

The user I/F 107 includes a display device such as a display unit and an input device such as a keyboard or a mouse. The user I/F 107 displays a secondary processing substance selecting screen (to be described later) and a license information editing screen (to be described later) and accepts input operations from these screens. The user I/F 107 also accepts input operations of the secondary processing for the original content C1.

The content processing unit 105 loads the original content C1 and limits an editing substance or a circulation substance applied to the original content C1 based on the license information L1. In this case, the limitation of the editing substance or the circulation substance by the content processing unit 105 can be realized by a known technique. For example, when the operation substance permitted by the license information L1 includes "insertion of graphic and text" and "translation", only editing operations that execute these operations are made valid to prevent another editing operation from being executed. In this case, the editing operation executed by the content processing unit 105 may be equal to the operation substance permitted by the license information L1, matching between the operation substance and the editing operation may be achieved by using information expressed in advance. For example, when "insertion of graphic" and "insertion of text" are prepared as editing operations, the matching is designed to be achieved by using information in which it is expressed that the editing operations correspond to "insertion of graphic and text" of the license information L1, respectively. As a result of a series of editing operation information and the editing operations executed by the content processing unit 105, the secondarily processed content is given to the operation substance deciding unit 106.

The operation substance deciding unit 106 decides the secondary processing operation, which is consequently performed as the editing operation substance of secondary processing for the original content C1, based on the series of editing operation information received from the content processing unit 105, and give a decision result including the operation substance to the secondary processing substance acquiring unit 101. For example, when the secondarily processed content is formed by inserting a graphic to a current content, of the permitted operation substances, a decision result representing the operation substance "insertion of graphic and text" is given to the secondary processing substance acquiring unit 101. In contrast to this, when the operation substances are partially replaced with a translation function simultaneously with insertion of a graphic, a decision result representing that two operation substances are performed is given to the secondary processing substance acquiring unit 101.

The license information dictionary file 108 is a data file that defines operation substances and conditions that can be designated as rights expressions for a content. The operation substances and the conditions are defined in a hierarchical structure. The details of the structure of the license information dictionary file 108 is explained below.

The permission verifying rule data file 109 is a data file in which mismatched combinations of combinations between rights expressions in the pieces of license information L1 and L2. The details of the structure of the permission verifying rule data file 109 is explained later.

The license information L1 is explained below. The license information L1 defines rights expressions of operations for the original content C1 and a secondarily processed content obtained by performing secondary processing to the original content C1.

The license information L1 consists of permission rights of four types, that is, a present-situation use right Ro that determines a rights expression of an operations for an original content, an adaptation right Rs that determines a rights expression of a secondary processing operation for a content, an secondary processing present-situation use right Ro' that defines an operation substance of an operation for a secondarily processed content, and a secondary processing adaptation right Rs' that determines a rights expression of a secondary processing operation for the secondarily processed content.

More specifically, the license information has the following configuration. More specifically, a rights expression G has a structure including at least an operation substance A and a condition C to be permitted. A right R related to use of a content is expressed by a logical sum of the rights expression G. In this case, the operation substance A expresses, for example, actions such as copy, print, and upload to a server performed for a content. The condition C expresses a logical product of requirement items E to be satisfied when each action is executed. For example, the condition C is a combination of the number of times of copying, a duration, a publication range, and the like. Each of the requirement items E can have a unique parameter P. More specifically, the use right R, the rights expression G, a rights expression Gi, and a condition Ci are expressed by forms given by the following Equations (1) and (2).

$$\text{Use right } R = (\text{or } G1, G2, G3 \ldots) \tag{1}$$

$$\text{Rights expression } Gi = (Ai, Ci)$$

$$\text{Condition } Ci = (\text{and } Ei1(P11, P12, \ldots)Ei2(P21, P22, \ldots) \ldots) \quad (2)$$

On the assumption of Equations (1) and (2), the use rights R and R' has an inclusive relation given by Equation (3).

$$R \sqsupseteq R' \quad (3)$$

This inclusive relation can be secured if a condition "G' is equal to G or a partial list of G (reduction in number of OR conditions) or a condition "E is equal to E' or a partial list of E' (increase in number of AND conditions) is satisfied.

In the embodiment, the permission rights of four types have an inclusive relation given by the following Expression (4).

$$Ro \sqsupseteq Ro' \text{ and } Rs \sqsupseteq Rs'' \quad (4)$$

The Expression represents that rights expressions for a secondarily processed content do not have a range wider than that of the rights expressions of an original content. When the inclusive relations of the permission rights are determined, the copyright of the secondarily processed content is limited to a predetermined range when the secondarily processed content is used as a secondary copyrighted work or a quotation of the original content. On the other hand, when the secondarily processed content is a secondarily processed content that falls within the range of a copy of the original content and that has poor creativity, this means that a secondary right is recognized.

Figure 2:
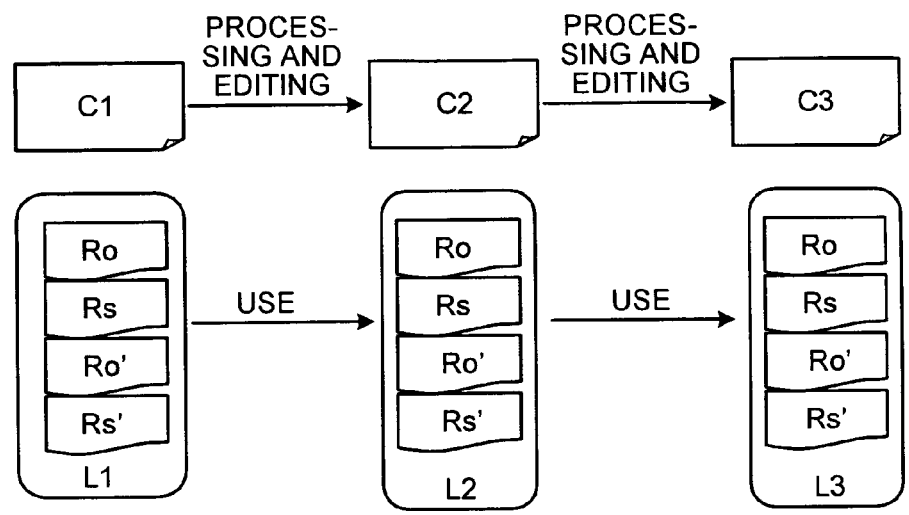
FIG. 2 is a diagram for explaining a circulation process of a content by using the digital content right establishing apparatus 100 according to the embodiment.

FIG. 2 is a diagram for explaining a circulation process of a content by using the digital content right establishing apparatus 100 according to the embodiment. As shown in FIG. 2, a secondarily processed content C2 using the content C1 and a secondarily processed content C3 using the secondarily processed content C2 are present. The contents C1, C2, and C3 have the pieces of license information L1, L2, and L3, respectively. In an area surrounded by a broken line in FIG. 2, inclusive relations between permission rights are expressed.

In the digital content right establishing apparatus 100 according to the embodiment, as shown in FIG. 2, a use right L of an original content is inherited to elements Ro(L') and Rs(L'), and Ro'(L') and Rs'(L') of the use right L of the secondarily processed content as initial values, and editing and decision are performed such that Equations (1) and (3) are satisfied, a support technique to safely set permission can be provided while causing a secondary processor of a content to regard the rights expressions of a copyright holder of the original content.

Figure 3:
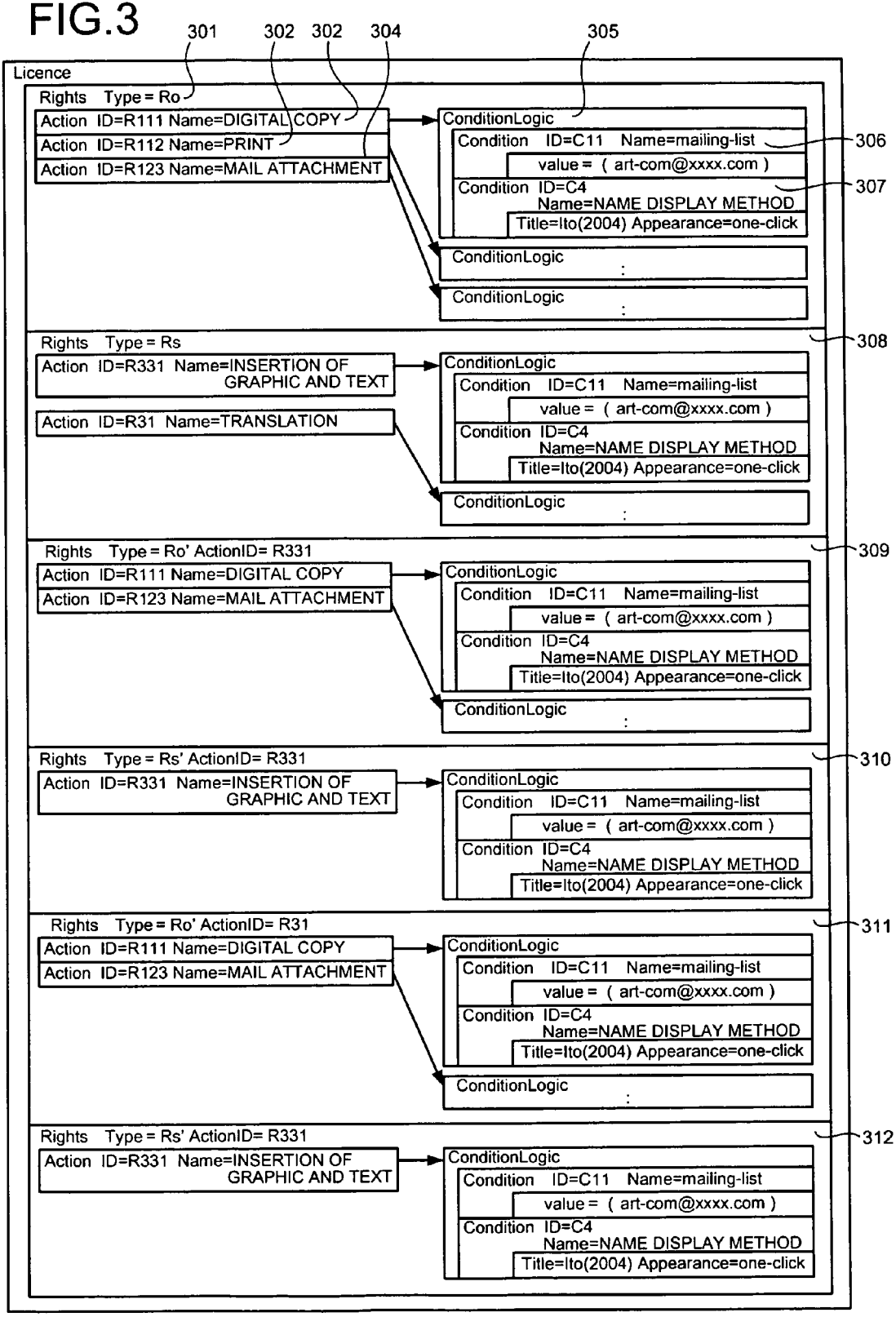
FIG. 3 is a diagram of a data structure that depicts an example of license information.

FIG. 3 is a diagram of a data structure that depicts an example of license information. In the license information, as described above, rights of four types, that is, a present-situation use right Ro 301 (rights Type=Ro), an adaptation right Rs 308 (Rights Type=Rs), secondary processing present-situation use rights Ro' 309 and Ro' 311 (Rights type=Ro'), and secondary processing adaptation rights Rs' 310 and Rs' 312 (Rights Type=Rs') are expressed.

The structure is explained by using the present-situation use right Ro 301 as an example. In the present-situation use right Ro 301, as rights expressions, operation substances 302 to 304 (Action ID=, Name=) are expressed, and operations expressed by the operation substances are permitted as operations that can be performed to a content. In this case, "Action ID" is an identification code unique to an operation substance, and "Name" is a name of an operation substance. The identification code and the name of the operation substance are registered in a license information dictionary file 108 (to be described later) in advance.

A condition 305 (Condition Logic) used for execution is linked to a operation substance 302, and the condition 305 is expressed by a logical product of requirement items 306 and 307 (condition ID=, Name=). In the requirement items 306 and 307, unique parameters (Value, Title, or the like) are defined.

In this case, "Condition ID" is an identification code unique to a condition, and "Name" is the name of a condition. The identification code and the name of the condition are registered in the license information dictionary file 108 (to be described later).

The adaptation right Rs 308, the secondary processing present-situation use rights Ro' 309 and Ro' 311, the secondary processing adaptation rights Rs' 310 and Rs' 312 having the same data structures as that of the present-situation use right Ro 301.

In the example in FIG. 3, in the present-situation use right Ro 301, as rights expressions, an operation substance "digital copy", "print", and "mail attachment" are expressed. This shows that the three operations are operations permitted for a content.

Similarly, in the adaptation right Rs 308, as rights expressions, operation substances "insertion of graphic and text" and "translation" are, expressed. This shows that the two operations are permitted as secondary processings for a content.

The secondary processing present-situation use rights Ro' and the secondary processing adaptation rights Rs' the numbers of which are equal to the number of operation substances expressed in the adaptation right Rs 308 are registered. More specifically, in association with the operation substances expressed in the adaptation right Rs 308, the secondary processing present-situation use right Ro' and the secondary processing adaptation right Rs' to secondarily processed contents formed by performing secondary processings of the operation substances are registered. In the example in FIG. 3, in the secondary processing present-situation use right Ro' 309, operation substances "digital copy" and "mail attachment" are expressed as rights expressions. This shows that the two operations are operations permitted form a secondarily processed content formed by performing "insertion of graphic and text" of "Action ID=R331" to an original content. Similarly, in the secondary processing present-situation use right Ro' 311, it is expressed that the operation is permitted for a secondarily processed content formed by replacing an operation for the original content with "translation" of "Action ID=R31".

In addition, in the secondary processing adaptation right Rs' 310, only an operation substance "insertion of graphic and text" is expressed as a rights expression. This shows that the operation is an operation permitted when a secondarily processed content formed by performing "insertion of graphic and text" of "Action ID=R331" to the original content is secondarily processed. Similarly, in a secondary processing adaptation right Ro' 312, it is expressed that the operation is an operation permitted for a secondarily processed content formed by replacing the operation for an original content with "translation" of "Action ID=R31".

In FIG. 3, although license information is expressed by a table format, the license information can also be expressed by forms such as an XML form, a relational database form, and a semantic network form.

The license information dictionary file 108 used in the digital content right establishing apparatus 100 according to the embodiment is explained below. The license information dictionary file 108 is a database file in which operation substances for contents expressed as rights expressions in the pieces of license information L1 and L2 and conditions for the operation substances are defined by a hierarchical structure.

FIG. 4A is an explanatory diagram that depicts an example of definition of operation substances registered in the license information dictionary file 108. As shown in FIG. 4A, the operation substances are defined such that identification codes, parent codes, and operation substance names are associated with each other.

The identification code is a code unique to an operation substance, and is set in "Action ID" of operation substances serving as rights expressions of the pieces of license information L1 and L2. The operation substance name is the name of an operation substance, and is set in "Name" of the operation substances serving as the rights expressions of the pieces of license information L1 and L2. The operation substances have a hierarchical structure and a conceptual inclusive relation. The parent code is an identification code of an operation substance serving as a parent node of the hierarchical structure.

FIG. 4B is an explanatory diagram visually that depicts the hierarchical structure of operation substances registered in the license information dictionary file 108. As shown in FIG. 4B, for example, an operation substance "R11: copy" is a concept including "R111: digital copy" and "R112: print". For this reason, as shown in FIG. 4A, a copy identification code "R11" is set as a parent code of "R111: digital copy" and "R112: print".

FIG. 4C is an explanatory diagram that depicts an example of definition of conditions for the operation substances registered in the license information dictionary file 108. As shown in FIG. 4C, the conditions are defined such that condition names, types and parameters (Element 1, type, Element 2, type) are associated with each other.

The identification code is a code unique to a condition, and is set in "Condition ID" of a condition linked to the operation substances serving as the rights expressions of the pieces of license information L1 and L2. The condition name is the name of a condition, and is set in "Name" of a condition linked to the operation substances of the pieces of license information L1 and L2. The type is indicates the type of a condition and has a data structure of a simple type (Int, String, or the like), a set type (Set), a structure type (Struct), or the like.

The conditions have a hierarchical structure like the operation substances and a conceptual inclusive relation. FIG. 4D is an explanatory diagram visually that depicts the hierarchical structure of the conditions. As shown in FIG. 4D, for example, a condition "C2: designation of duration" is a concept including "C21: Duration", "C22: Date", and "C23: Times".

The license information dictionary file 108 is preferably standardized. For example, MPEG21-RDD or the like can also be used as the license information dictionary file 108.

The permission verifying rule data file 109 used in the digital content right establishing apparatus 100 according to the embodiment is explained below. The permission verifying rule data file 109 is a data file in which mismatched combinations between rights expressions in the pieces of license information L1 and L2.

FIG. 5 is a diagram of a data structure diagram that depicts an example of substances of the permission verifying rule data file 109. As shown in FIG. 5, in the permission verifying rule data file 109, as a combination of permission (Rxx) and nonpermission (¬Ryy), proper (blank) or improper (F) is expressed in a table format.

For example, in FIG. 5, a verification rule 501 " ¬R111∧R123 ⇒F" indicates that it is improper (F) that a rights expression is set by a combination of "digital copy is nonpermitted" (¬R111) and "mail attachment is permitted" (R123). In the embodiment, as shown in FIG. 5, the verification rule is expressed in a table format. However, the verification rule is not limited to the table format. For example, the verification rule can also be expressed in a format of a first-order predicate logic, a format of a semantic network, and a format of IF-THEN.

A digital content right establishing process performed by the digital content right establishing apparatus 100 according to the embodiment having the above configuration. In the embodiment, a process that generates the license information L2 of the secondarily processed content C2 consequently generated by secondary processing from the license information L1 of the original content C1 is performed when the original content C1 is secondarily processed by the content processing unit 105.

In the digital content right establishing apparatus 100 according to the embodiment, the secondary processing substance acquiring unit 101 performs a secondary processing substance acquiring process that acquires an operation substance of secondary processing from the license information L1 of the original content C1, the default license information generating unit 102 performs a default license information generating process that generates default license information from the operation substance obtained by the default license information generating unit 102, and the license information editing unit 103 performs a license information editing process that edits the generated default license information with a rights expression selected by a user, so that the license information L2 of the secondarily processed content C2 is generated. In generation of the license information L1 and L2 of the secondarily processed content C2, a license information deciding process that decides inclusive relations among the present-situation use right Ro, the adaptation right Rs, the secondary processing present-situation use right Ro', and the secondary processing adaptation rights Rs' in the pieces of license information L2 generated by the license information deciding unit 104 and decides mismatching between rights expressions set by the rights is performed.

Figure 6:
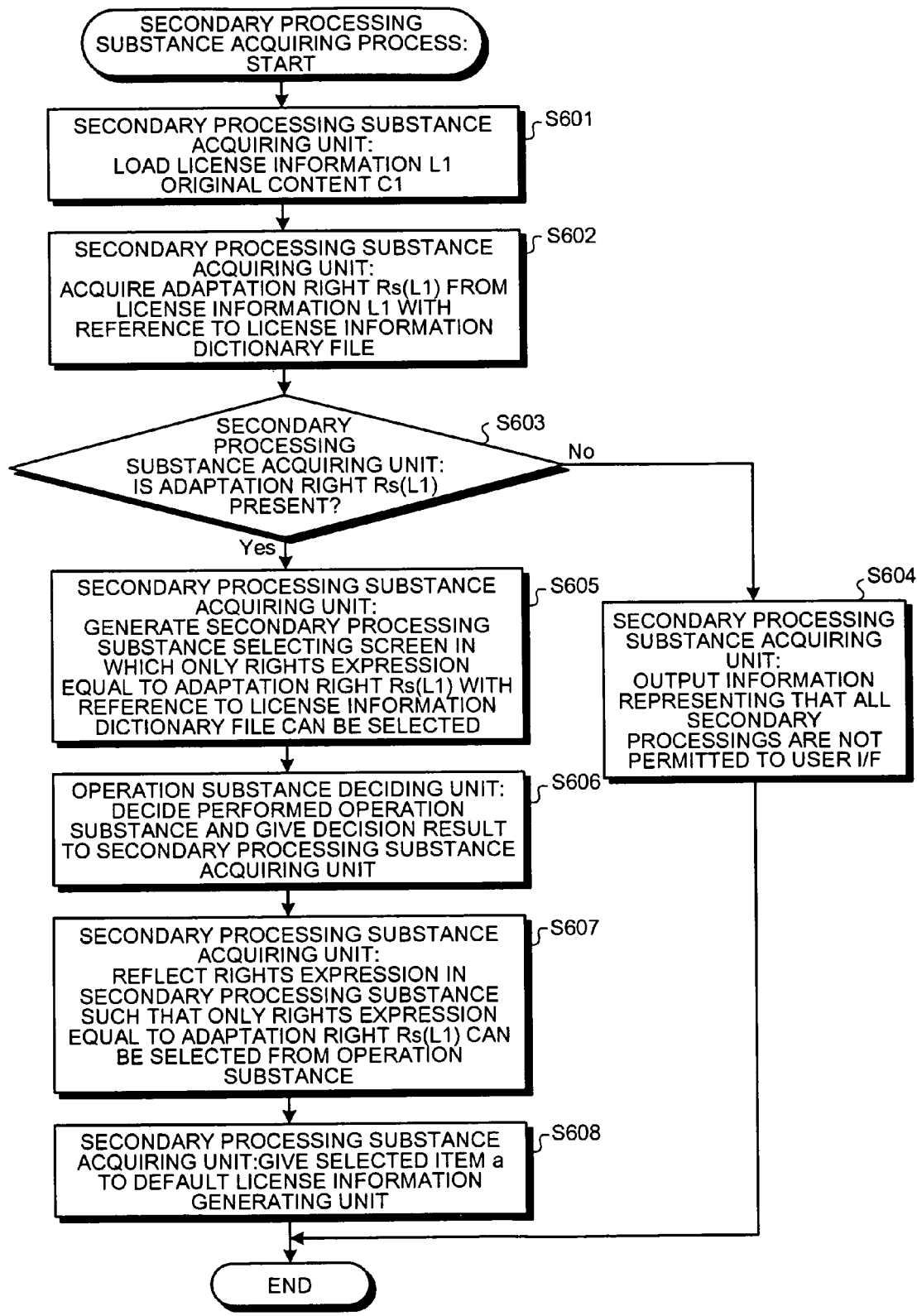
FIG. 6 is a flow chart that depicts a procedure of the secondary processing substance acquiring process.

A secondary processing substance acquiring process performed by the secondary processing substance acquiring unit 101 is explained below. FIG. 6 is a flow chart that depicts a procedure of the secondary processing substance acquiring process.

The secondary processing substance acquiring unit 101 loads the license information L1 of the original content C1 (step S601). The embodiment is explained on the assumption that the original content C1 and the license information L1 are separated from each other. When the license information L1 is integrally included in the original content C1, a process that extract the license information L1 from the original content C1 may be performed in a previous stage of the secondary processing substance acquiring process.

When the license information L1 is loaded at step S601, the adaptation right Rs (L1) serving as a permission right belonging to secondary process from the loaded license information L1 with reference to the license information dictionary file 108 (step S602). In this case, since the operation substance serving as the rights expression set in the adaptation right Rs (L1) has a hierarchical structure, the license information dictionary file 108 is referred to recognize a position of the hierarchical structure to which the set operation substance belongs. Therefore, unlike the embodiment, when the operation substances are not defied by a hierarchical structure, the adaptation right Rs (L1) may be directly extracted from the license information L1 without reference to the license information dictionary file 108.

After the process at step S602, the secondary processing substance acquiring unit 101 decides whether the adaptation right Rs (L1) is present in the license information L1 and can be acquired (step S603). When determined that the adaptation right Rs (L1) is not present in the license information L1 and cannot be acquired (step S603: NO), the secondary processing substance acquiring unit 101 determines that all secondary processing for the original content C1 are not permitted. The secondary processing substance acquiring unit 101 outputs the information representing that all the secondary processing are not permitted to the user I/F 107 to notify a user of the information (step S604). All the processes are ended without executing the subsequent default license information generating process, the license information editing process and the license information deciding process.

On the other hand, at step S603, it is determined that the adaptation right Rs (L1) is present in the license information L1 and can be acquired (step S603: Yes), the secondary processing substance acquiring unit 101 generates a secondary processing substance selecting screen that can select only a rights expression corresponding to the adaptation right Rs (L1) with reference to the license information dictionary file 108 (step S605).

On the other hand, the operation substance deciding unit 106 receives a series of editing operation information from the content processing unit 105 and decides a specific secondary processing consequently performed to the original content C1 based on the received series of editing operation information. The operation substance deciding unit 106 gives a decision result including the operation substance of the performed secondary processing to the secondary processing substance acquiring unit 101 (step S606).

The secondary processing substance acquiring unit 101 that receives the decision result including the operation substance of the performed secondary processing from the operation substance deciding unit 106 selectively reflects only a rights expression corresponding to the adaptation right Rs (L1) in the secondary processing substance selecting screen generated at step S605 based on the received operation substance, and outputs the secondary processing substance selecting screen to the user I/F 107 (step S607).

Figure 7:
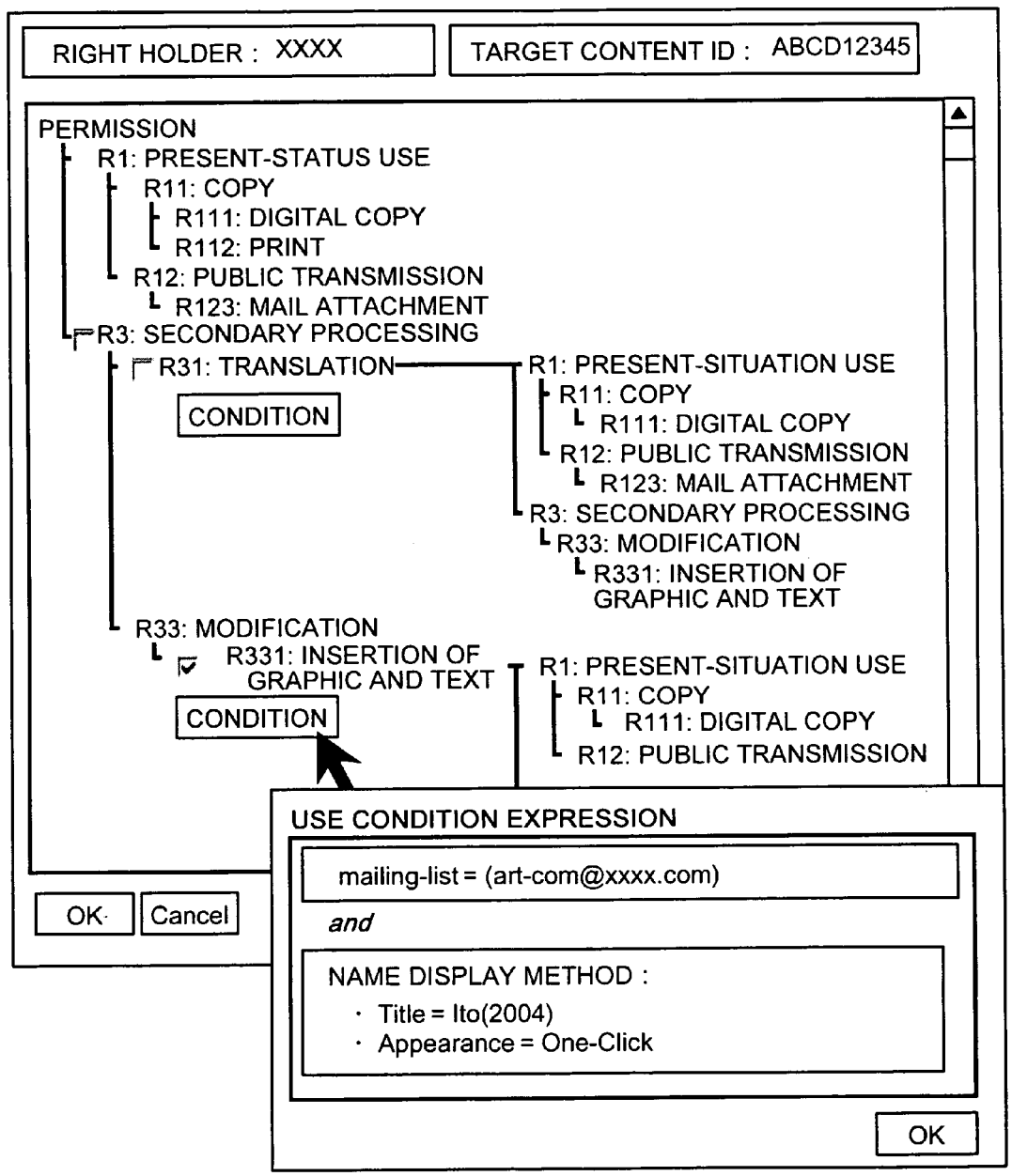
FIG. 7 is a pattern diagram that depicts an example of the secondary processing substance selecting screen.

FIG. 7 is a pattern diagram that depicts an example of the secondary processing substance selecting screen. FIG. 7 shows an example along the substances of the adaptation right Rs (L1) of the license information L1 shown in FIG. 3. As shown in FIG. 7, as adaptation rights that can be selected on the secondary processing substance selecting screen, "R31: translation" and "R331: insertion of graphic and text". FIG. 7 is a case a decision result including the operation substance "insertion of graphic and text" is received from the operation substance deciding unit 106. For this reason, a check mark is added to the check box of "insertion of graphic and text". Condition display buttons are displayed for alternatives, respectively. When a condition display button is clicked to make it possible to display the condition of the corresponding alternative.

When a rights expression marked on the secondary processing substance selecting screen consists of subordinate rights expressions, and when a user selects an item of a desired rights expression from the subordinate rights expressions to input the item, the secondary processing substance acquiring unit 101 receives an input item a and gives the item a to the default license information generating unit 102 (step S608). In the example in FIG. 7, since "insertion of graphic and text" cannot be further decomposed, the operation substance is directly selected.

In the embodiment, default permission is generated such that the decision result of the operation substance is reflected. In contrast to this, the following configuration may be used. That is, a user is interactively caused to select a processing substance prior to the secondary processing for the original content, and the processing substance is compared with a decision result of a processing substance that is actually performed later to verify whether the selection has an error.

Figure 8:
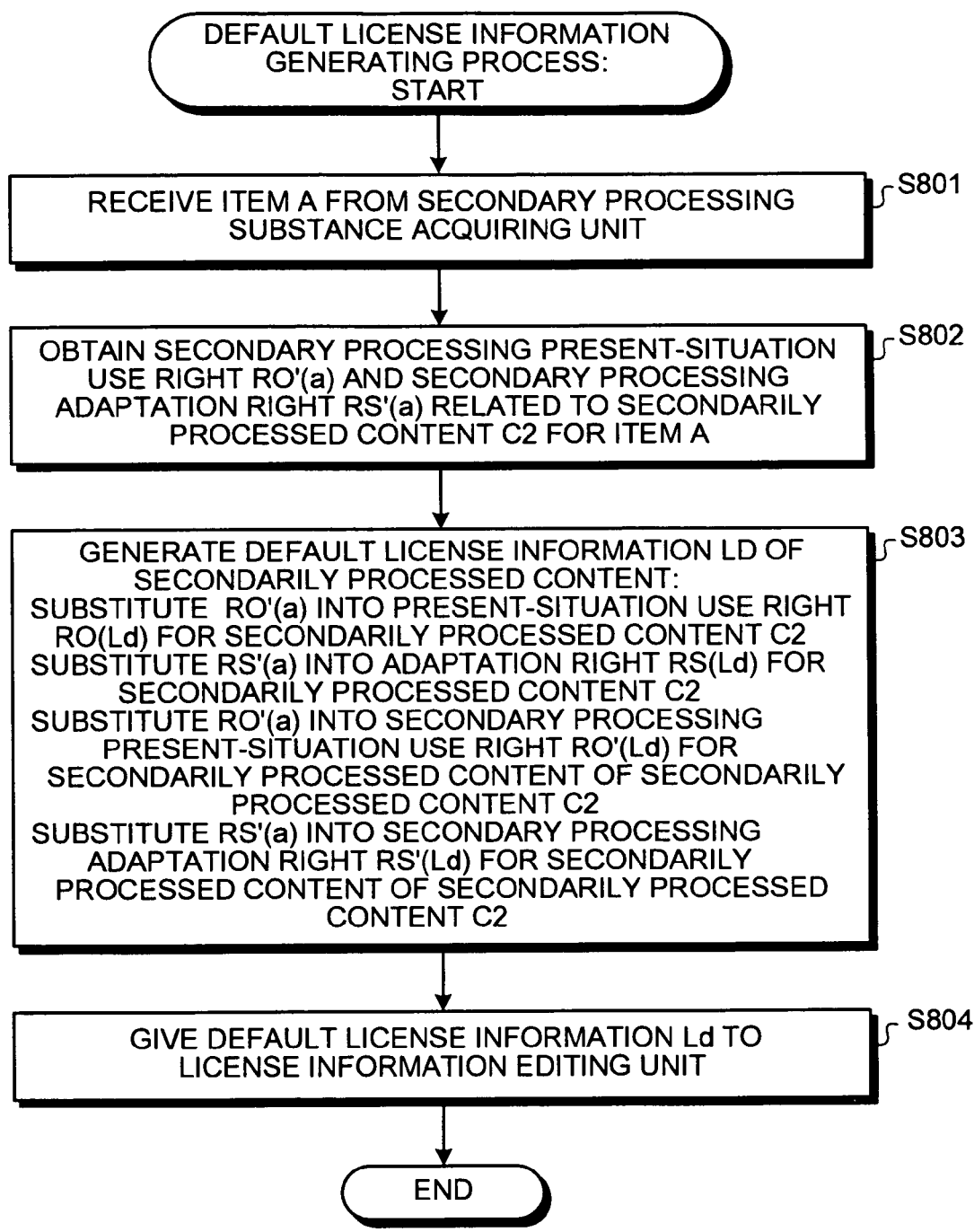
FIG. 8 is a flow chart that depicts a procedure of the default license information generating process.

A default license information generating process performed by the default license information generating unit 102 is explained below. FIG. 8 is a flow chart that depicts a procedure of the default license information generating process.

When the default license information generating unit 102 receives an item a from the secondary processing substance acquiring unit 101 (step S801), the default license information generating unit 102 calculates a content secondary processing present-situation use right Ro(a)' and a secondary processing adaptation right Rs(a)' of the secondarily processed content C2 corresponding to the item a (step S802).

Default license information Ld serving as an initial value of the license information L2 of the secondarily processed content C2 is generated by the following processes (step S803). Ro'(a) is substituted into a present-situation use right Ro(Ld) of the secondarily processed content C2, and Rs'(a) is substituted into an adaptation right Rs(Ld) to the secondarily processed content C2. Ro'(a) is substituted into a secondary processing present-situation use right Ro'(Ld) to a content obtained by further performing secondary processing to the secondarily processed content C2, and Rs'(a) is substituted into a secondary processing adaptation right Rs'(Ld) to the content obtained by further performing secondary processing to the secondarily processed content C2.

In this manner, Ro, Rs, Ro', and Rs' included in the license information L2 of the secondarily processed content C2 are limited to the set range of the license information L1 of the original content C1 each. This shows that permission related to the secondarily processed content C2 is limited by a copyright holder of the original content C1. Finally, the default license information Ld is given to the license information editing unit 103 (step S804). When a plurality of items a satisfy the conditions, secondary processing use rights are calculated as a logical product of secondary processing use right of the respective items and, similarly, secondary processing adaptation rights are calculated as a logical addition of secondary processing adaptation rights of the respective items, so that default license information Ld can be obtained.

A license information editing process performed by the license information editing unit 103 is explained below. FIG. 9 is a flow chart that depicts a procedure of the license information editing process. In the license information editing process, license information L2 of a secondarily processed content is generated by editing the default license information Ld.

The license information editing unit 103 receives the default license information Ld from the default license information generating unit 102 (step S901). The license information editing unit 103 generates a selecting•editing screen including a partial tree structure that reaches only a rights expression equal to the default license information Ld with reference to the license information dictionary file 108 and outputs the selecting•editing screen to the user I/F 107 (step S902). In this case, the license information dictionary file 108 is referred to acquire a hierarchical structure of operation substances set as rights expressions in the default license information Ld to obtain the partial tree structure. Editing that can be performed to the default license information Ld is limited to deletion and a change of condition to prevent the range of rights expressions of the license information L2 of the secondarily processed content C2 from being wider than the range of the rights expressions of the license information of the original content C1.

Figure 10A:
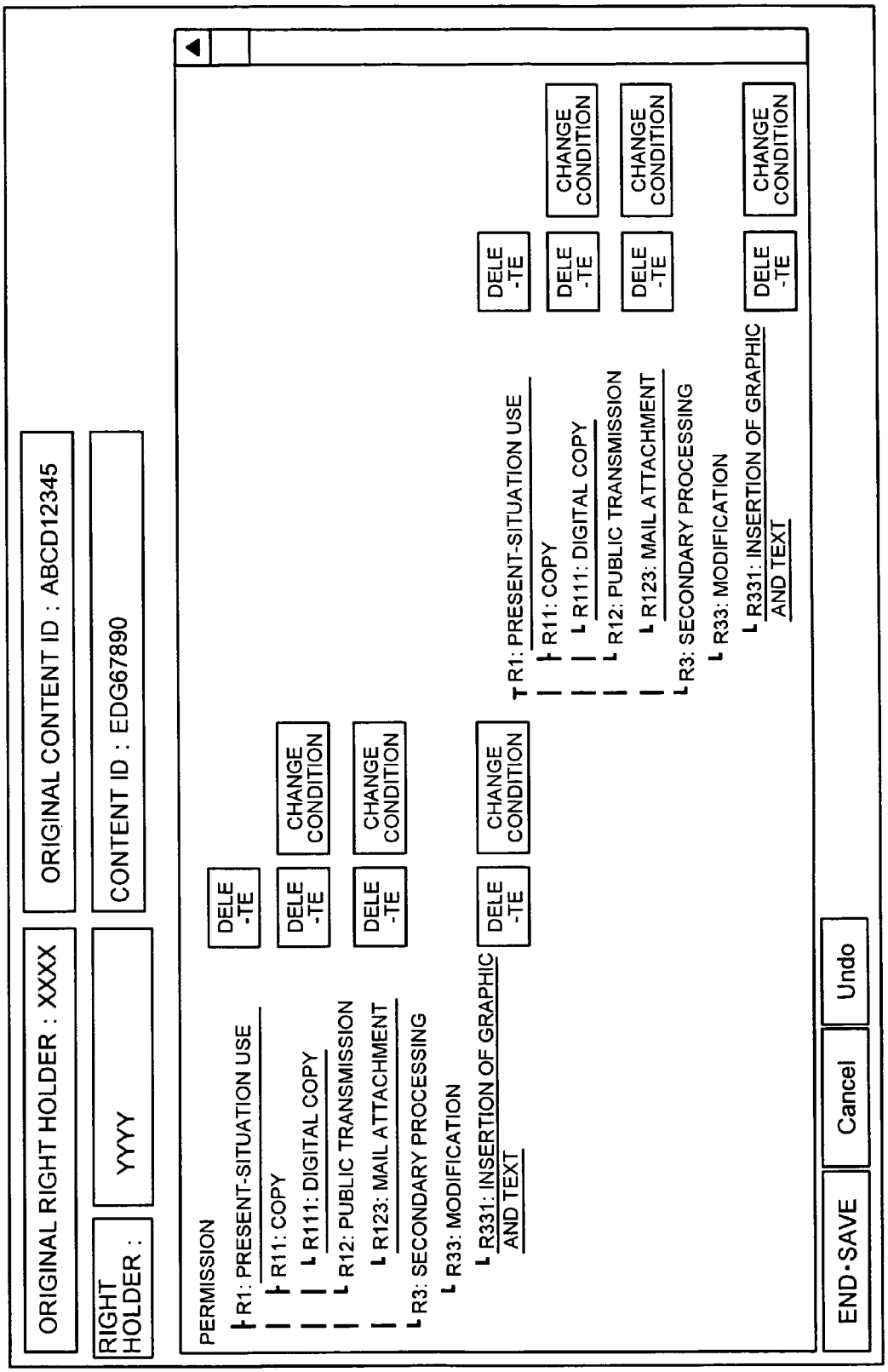
FIG. 10A is a pattern diagram that depicts an example of the selecting•editing screen.

FIG. 10A is a pattern diagram that depicts an example of the selecting•editing screen. FIG. 10A shows default license information Ld (initial value of the license information L2) obtained when a rights expression "R331: insertion of graphic and text" on the secondary processing substance selecting screen shown in FIG. 7 is a decision result. On the condition editing screen, an underline and an editing button are added to only an item that can be edited. With respect to intermediate nodes such as "R1: present-situation use", only a button to simultaneously delete lower nodes is added.

When a user performs an editing operation for the default license information Ld on the selecting•editing screen, the license information editing unit 103 accepts the corresponding editing (step S903). The license information editing unit 103 decides whether the editing substance performed to the default license information Ld is deletion (step S904).

When determined that the editing substance performed to the default license information Ld is deletion (step S904: Yes), a rights expression selected as a rights expression to be deleted from the default license information Ld is deleted form the default license information Ld, and the selecting•editing screen obtained after the condition is deleted is regenerated and output to the user I/F 107 (step S905).

The license information editing unit 103 decides whether the editing substance performed to the default license information Ld is a change of condition (step S906). When determined that the editing substance performed to the default license information Ld is a change of condition (step S906: Yes), a condition of a rights expression selected as the change of condition from the default license information Ld is loaded, and a condition editing screen is generated and output to the user I/F 107 (step S907).

Figure 10B:
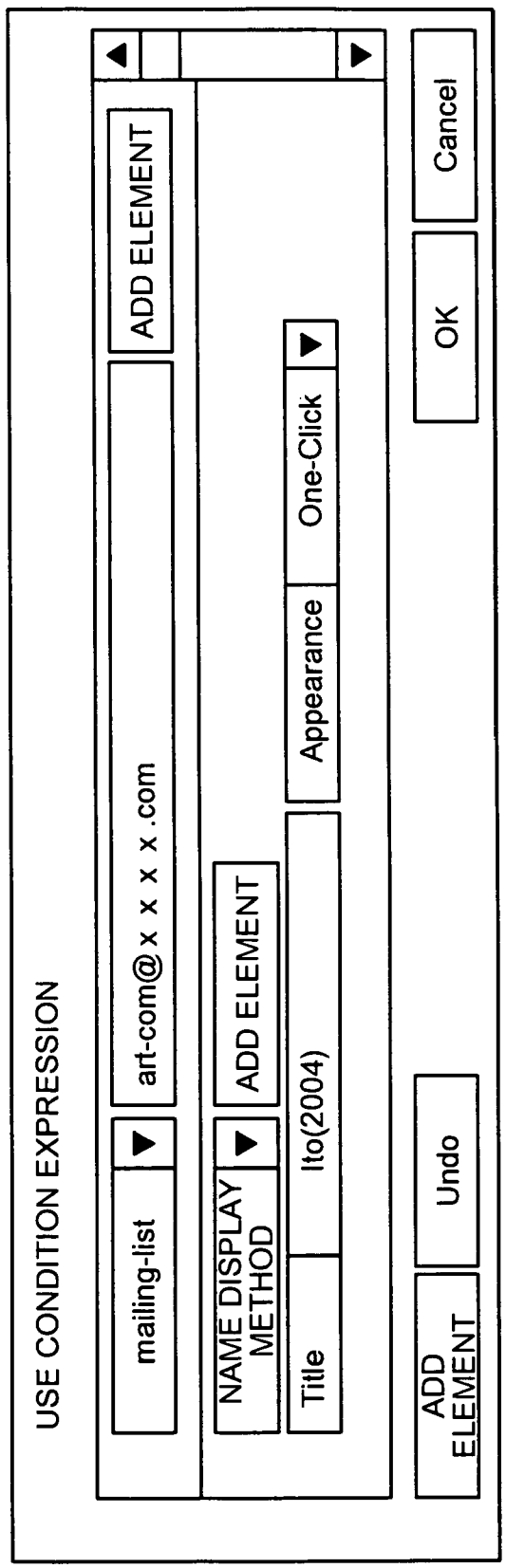
FIG. 10B is a pattern diagram that depicts an example of a condition editing screen.

FIG. 10B is a pattern diagram that depicts an example of a condition editing screen. The condition editing screen, as shown in FIG. 10B, is designed to make it possible to perform editing that adds a condition or adds a parameter unique to the condition. This design is made to prevent the set ranges of the present-situation use right Ro, the adaptation right Rs, the secondary processing present-situation use right Ro', and the secondary processing adaptation right Rs' included in the license information 12 of the secondarily processed content C2 from being wider than the set ranges of the license information L1 of the original content C1, respectively.

A user accepts editing designated on the condition editing screen to reflect information of conditions or condition attributes in the conditions of rights expressions of the default license information Ld (step S908). The editing processes at steps S903 to S908 are executed until the user inputs a designation of the end of editing (step S909).

Upon completion of the editing, the license information editing unit 103 sets the edited default license information Ld as the license information L2 of the secondarily processed content C2 (step S910), and the license information deciding unit 104 performs a license information deciding process for the license information L2 (step S911). The details of the license information deciding process of the license information L2 is explained later.

It is decided whether a decision result of the license information deciding process is positive (step S912). When the decision result is positive (step S912: Yes), the license information L2 is stored in a storage medium such as an HDD (step S913). On the other hand, when the decision result of the license information deciding process is not positive (step S912: No), a contradictory state such as mismatching of the rights expressions is displayed on the user I/F 107 (step S914), and the editing process started from step S903 is repeatedly executed.

Figure 11A:
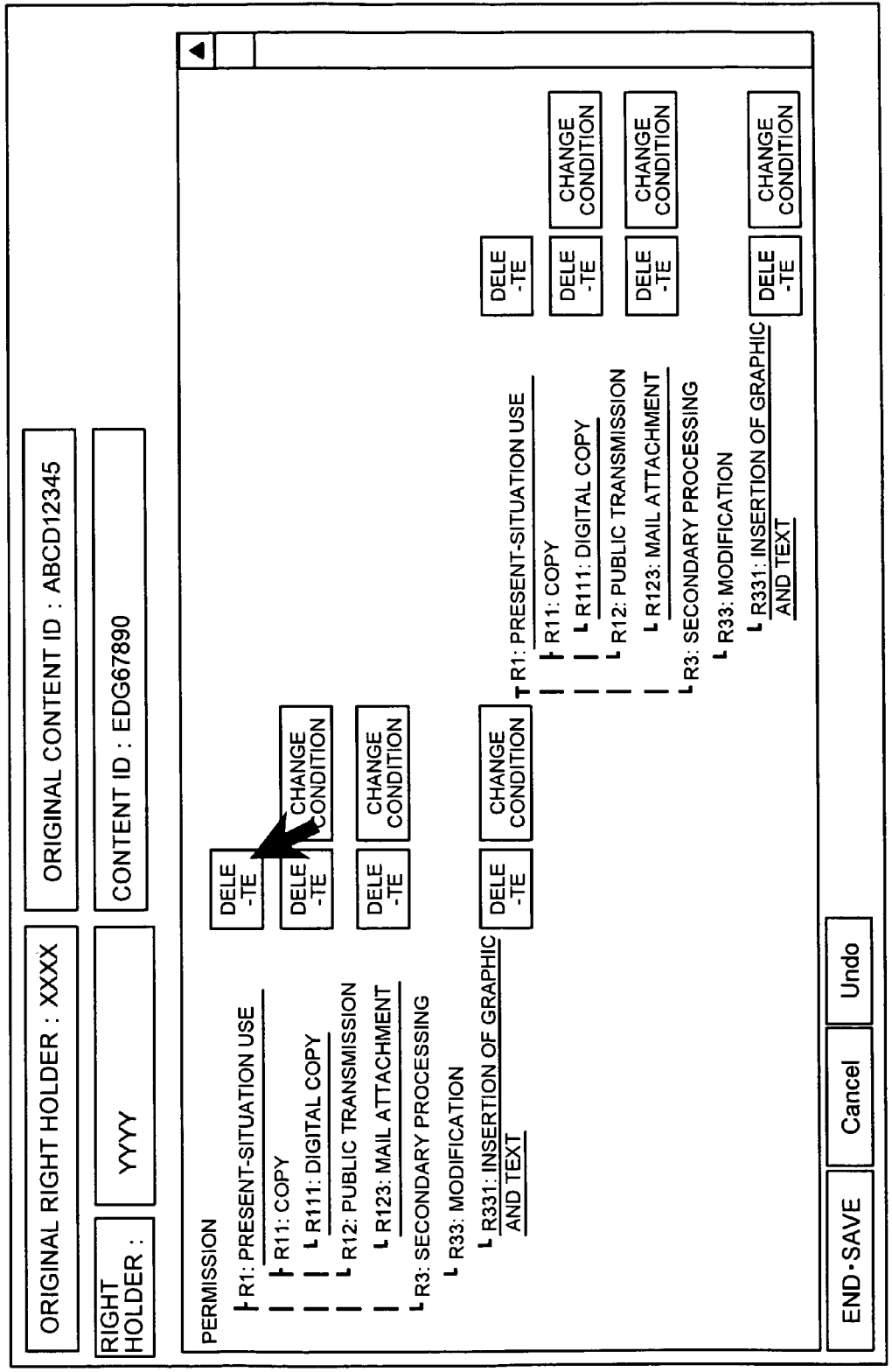
FIG. 11A is a pattern diagram that depicts an example in which the initial value is edited to delete "R1: present-situation use" on the selecting•editing screen.
Figure 11B:
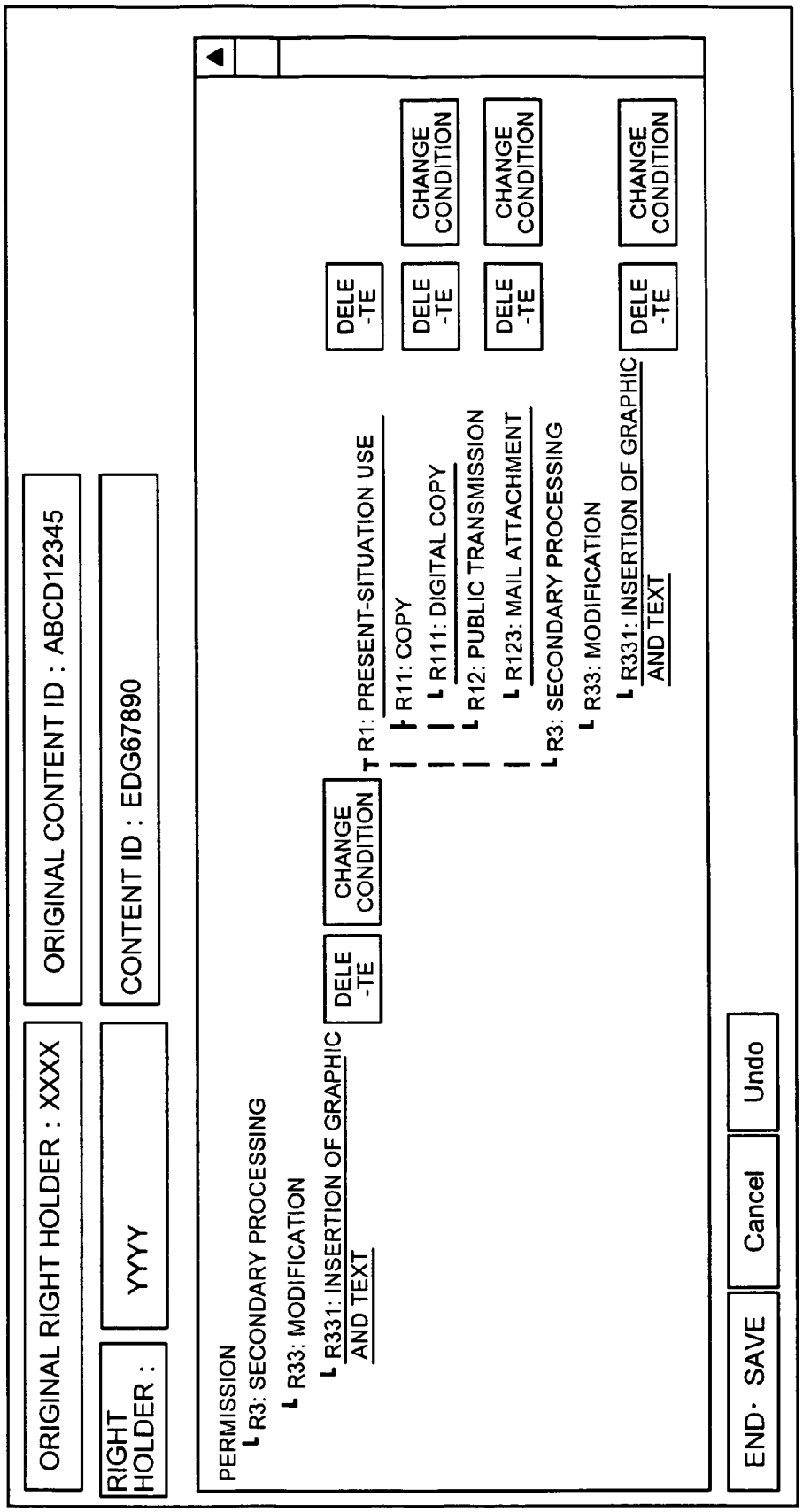
FIG. 11B is a pattern diagram that depicts an example of a condition editing screen obtained when editing is performed to delete "R1: present-situation use"

FIG. 11A is a pattern diagram that depicts an example in which the initial value is edited to delete "R1: present-situation use" on the selecting•editing screen. FIG. 11B is a pattern diagram that depicts an example of a condition editing screen obtained when editing is performed to delete "R1: present-situation use".

FIG. 12 is a pattern diagram that depicts an example in which conditions and a parameter unique to the condition are added on the condition editing screen. In this example, "location" and "Duration" are added as new conditions, and a parameter is added to "name display method".

Figure 13:
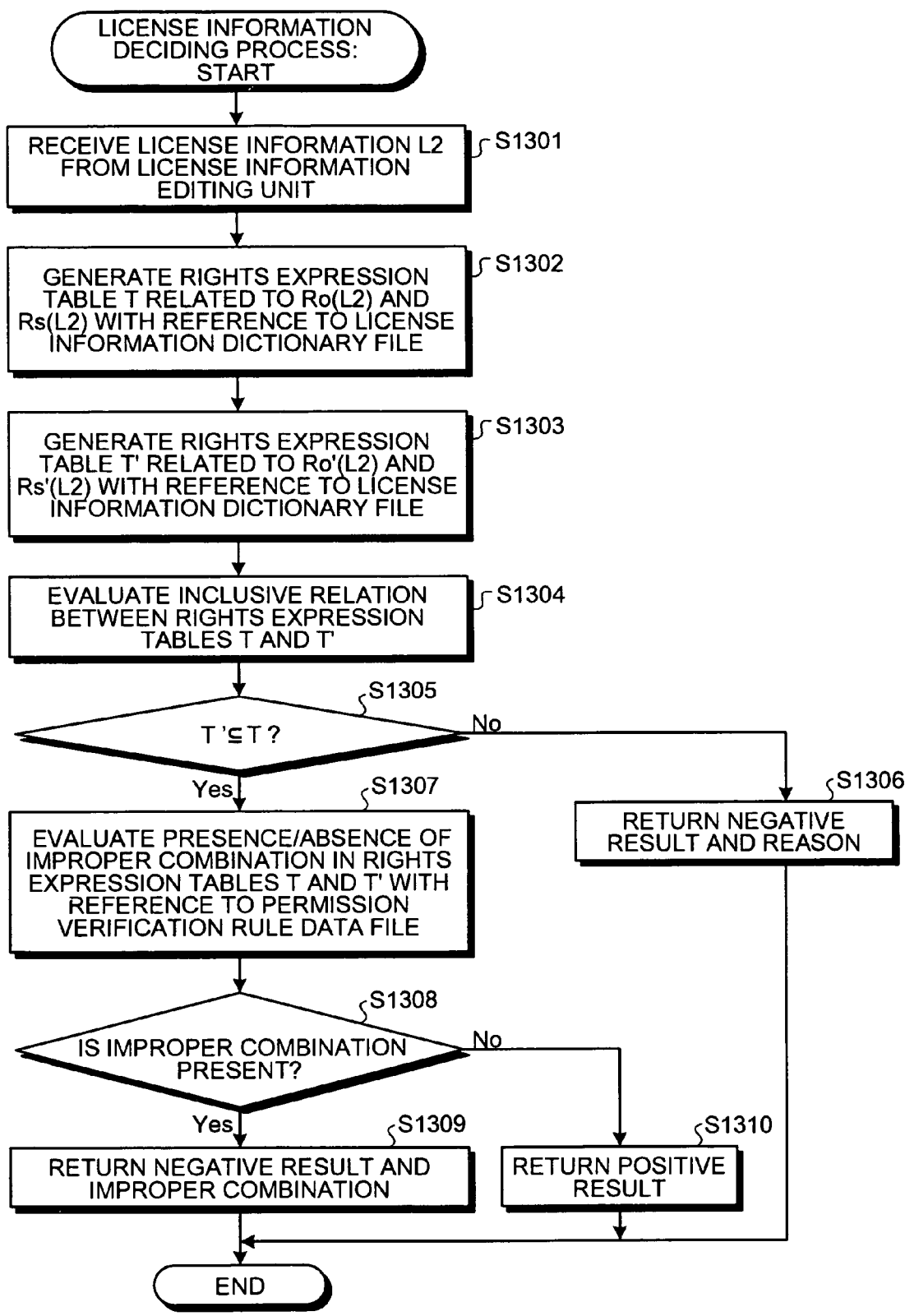
FIG. 13 is a flow chart that depicts a procedure of the license information deciding process.

A license information deciding process executed by the license information deciding unit 104 at step S911 is explained below. FIG. 13 is a flow chart that depicts a procedure of the license information deciding process.

The license information deciding unit 104 receives the license information L2 from the license information editing unit 103 (step S1301). The license information deciding unit 104 generates a rights expression table T related to a present-situation use right Ro(L2) and an adaptation right Rs(L2) with reference to the license information dictionary file 108 (step S1302). The license information deciding unit 104 generates a rights expression table T related to a secondary processing present-situation use right Ro'(L2) and a secondary processing adaptation right Rs'(L2) with reference to the license information dictionary file 108 (step S1303).

The rights expression table T is table data in which rights expressions set in the present-situation use right Ro(L2) and the adaptation right Rs(L2) are extracted as permitted operations and operations that are not permitted are listed as nonpermitted operations. The rights expression table T' is table data in which rights expressions set in the secondary processing present-situation use right Ro'(L2) and the secondary processing adaptation right Rs'(L2) are extracted as permitted operations and operations that are not permitted are listed as nonpermitted operations.

An inclusive relation between the generated rights expression tables T and T' is evaluated (step S1304) to check whether a relation $T' \subset T$ is satisfied (step S1305). When determined that $T' \subset T$ is not satisfied (step S1305: No), the range of the secondary processing present-situation use right Ro'(L2) is wider than the range of the present-situation use right Ro(L2), or the range of secondary processing adaptation right Rs'(L2) is wider than the range of the adaptation right Rs(L2). For this reason, a negative result and a reason therefor (right having a wide range and rights expressions) are returned to the license information editing unit 103 (step S1306).

On the other hand, when determined at step S1305 that $T' \subset T$ is satisfied (step S1305: Yes), the secondary processing present-situation use right Ro'(L2) is set within the range of the adaptation right Rs(L2), and it is determined that a normal inclusive relation is satisfied. The presence/absence of an improper combination in the rights expressions set in the rights expression tables T and T' is evaluated (step S1307) to decide whether the rights expressions include an improper combination with reference to the permission verifying rule data file 109 (step S1308).

When determined that the rights expressions include an improper combination (step S1308: Yes), a negative result and the corresponding improper combination are returned to the license information editing unit 103 (step S1309). On the other hand, when determined at step S1308 that the rights expressions do not include an improper combination (step S1308: No), a positive result is returned to the license information editing unit 103 (step S1310). The result is determined as a deciding process result at the step S912 by the license information editing unit 103.

FIG. 14A is an explanatory diagram that depicts an example of the rights expression table T. FIG. 14B is an explanatory diagram that depicts an example of the rights expression table T'. FIGS. 14A and 14B are based on the examples of the rights expressions shown in FIG. 11B. Since an inclusive relation T'⊃T is satisfied, a negative decision result is obtained.

The digital content right establishing apparatus according to the embodiment includes a control device such as a CPU, a storage device such as a ROM (Read Only Memory) or a RAM, an HDD, an external storage device such as an HDD or a CD drive, and a user I/F 107 (display device such as a display unit and an input device such as a keyboard or a mouse) and has a hardware configuration using a conventional computer.

The digital content right establishing program executed by the digital content right establishing apparatus according to the embodiment is provided such that the program is recorded on a computer readable recording medium such as a CD-ROM, a flexible disk (FD), a CD-R, or a DVD (Digital Versatile Disk) as a file of a format in which data can be installed or a format in which data can be executed.

The digital content right establishing program executed by the digital content right establishing apparatus according to the embodiment may be provided such that the digital content right establishing program is stored in a computer connected to a network such as the Internet and downloaded through the network. The digital content right establishing program executed by the digital content right establishing apparatus according to the embodiment may be provided or delivered through a network such as the Internet.

The digital content right establishing program according to the embodiment may be provided such that the digital content right establishing program is incorporated in a ROM or the like.

The digital content right establishing program executed by the digital content right establishing apparatus according to the embodiment has a module configuration including the above units (the secondary processing substance acquiring unit 101, the default license information generating unit 102, the license information editing unit 103, the license information deciding unit 104, the content processing unit 105, and the operation substance deciding unit 106). In actual hardware, the CPU (processor) reads the digital content right establishing program from the storage medium and executes the digital content right establishing program to load the respective units on the main storage device, thereby generating the secondary processing substance acquiring unit 101, the default license information generating unit 102, the license information editing unit 103, the license information deciding unit 104, the content processing unit 105, and the operation substance deciding unit 106 on the main storage device.

In the digital content right establishing apparatus according to the embodiment, when the content processing unit 105 performs secondary processing to the original content C1, the rights expressions of the license information L2 of the secondarily processed content C2 are generated such that the range of the rights expressions for the secondarily processed content C2 is not wider than that of the rights expressions of the license information L1 of the original content C1. For this reason, appropriate rights expressions can be easily set without considering the complexity of a copyright given to a secondarily processed content depending on a form of secondary processing such as a form representing that the secondarily processed content C2 generated by the secondary processing is a secondary copyrighted work, a copy of the original content C1, or a legal quotation of the original content C1, and a sound secondarily processed content can be circulated.

In particular, in the digital content right establishing apparatus according to the embodiment, when a secondarily processed content in the secondarily processed content C2 is integrated with the original content C1 without keeping an original form of the original content C1, a user need not be aware of the substances of copyrights changing depending on a secondary copyrighted work, a copy, and the like. For this reason, appropriate rights expressions can be easily generated.

In the digital content right establishing apparatus according to the embodiment, the content processing unit 105 verifies inclusive relations of rights set in the license information L2 of the generated secondarily processed content C2 and improper combinations between rights expressions. For this reason, proper rights expressions can be easily set while keeping matching between the rights expressions.

As described above, the digital content right establishing apparatus, the digital content right establishing method, and the digital content right establishing program according to the present invention can be applied to an apparatus, a method, and a program that generate license information of a secondarily processed content obtained when an original content is secondarily processed to generate a secondarily processed content.

According to the embodiment, when an original content is secondarily processed, a rights expression for a secondarily processed content is established such that the range of the rights expression for the secondarily processed content is not wider than that for the original content. For this reason, appropriate rights expressions can be set while keeping matching between the rights expressions without considering the form of the secondary processing and a complex type of a copyright to the secondarily processed content. Therefore, a sound secondarily processed content can be advantageously achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for generating copyright information for a secondarily processed content obtained by performing secondary processing on an original content, comprising:

a secondary processed substance acquiring unit that acquires an adaptation right that determines a rights expression of a secondary processing operation for the original content, from license information of the original content, and that acquires operations designated by a user from the rights expression of secondary processing determined by the adaptation right acquired, the license information of the original content including a present-status use right that determines a rights expression of an operation for the original content, the adaptation right, a secondary processing present-status use right that determines a rights expression of an operation for the secondarily processed content, and a secondary processing adaptation right that determines a rights expression of a secondary processing operation for the secondarily processed content;

a default license information generating unit that obtains the secondary processing present-status use right and the secondary processing adaptation right for the operation acquired by the secondary processed substance acquiring unit, and generates default license information of the secondarily processed content that includes the present-status use right including a condition equal to a condition included in the obtained secondary processing present-status use right, the adaptation right including a condition equal to a condition included in the obtained secondary processing adaptation right, the secondary processing present-status use right including a condition equal to a condition included in the obtained secondary processing present-status use right, and the secondary processing adaptation right including a condition equal to a condition included in the obtained secondary processing adaptation right; and a license information editing unit that accepts selection of a desired rights expression by a user from the rights expressions of the default license information generated by the default license information generating unit to generate license information of the secondarily processed content from the selected rights expression.

2. The apparatus according to claim 1, further comprising:
a content processing unit that performs secondary processing on the original content; and
an operation substance deciding unit that decides an operation of secondary processing performed on the original content based on operation information representing a series of operations of the secondary processing for the original content, wherein
the secondary processed substance acquiring unit acquires an operation designated by a user from the operation decided by the operation substance deciding unit.

3. The apparatus according to claim 1, further comprising:
a dictionary storage unit that stores a license information dictionary that has operations for a content that is designated as the rights expression in a hierarchical structure, wherein
the secondary processing substance acquiring unit displays the rights expression of a secondary processing determined by the adaptation right acquired in the hierarchical structure in the license information dictionary, and acquires the operation of the secondary processing designated by a user from the displayed rights expression.

4. The apparatus according to claim 1, further comprising:
a license information deciding unit that decides whether a condition included in the present-status use right and a condition included in the adaptation right of the license information of the secondarily processed content generated by the license information editing unit include a condition included in the secondary processing present-status use right and a condition included in the secondary processing adaptation right of the license information of the secondarily processed content generated by the license information editing unit, wherein
the license information editing unit, when determined by the license information deciding unit that the condition included in the present-status use right and the condition included in the adaptation right of the license information of the secondarily processed content do not include the condition included in the secondary processing present-status use right and the condition included in the secondary processing adaptation right of the license information of the secondarily processed content generated by the license information editing unit, accepts a selection of a desired rights expression from the permission contents of the default license information again to generate the license information of the secondarily processed content from the selected rights expression.

5. The apparatus according to claim 4, further comprising:
a permission verification rule storing unit that stores permission verification rule information in which a mismatched combination between the rights expressions is determined, wherein
the license information deciding unit further decides whether combinations between the rights expressions of the present-status use right, the adaptation right, the secondary processing present-status use right, and the secondary processing adaptation right in the license information of the secondarily processed content generated by the license information editing unit include a mismatched combination determined by the permission verification rule information, and
the license information editing unit, when the license information deciding unit decides that the combinations include the mismatched combination determined by the permission verification rule information, further accepts selection of a desired rights expression from the rights expressions of the default license information again to generate the license information of the secondarily processed content from the selected rights expression.

6. A method of generating copyright information for a secondarily processed content obtained by performing secondary processing on an original content, comprising:
acquiring an adaptation right that determines a rights expression of a secondary processing operation for the original content, from license information of the original content, the license information of the original content including a present-status use right that determines a rights expression of an operation for the original content, the adaptation right, a secondary processing present-status use right that determines a rights expression of an operation for the secondarily processed content, and a secondary processing adaptation right that determines a rights expression of a second processing operation for the secondarily processed content;

acquiring operations designated by a user from the rights expression of secondary processing determined by the adaptation right acquired;

obtaining the secondary processing present-status use right and the secondary processing adaptation right for the acquired operation;

generating default license information of the secondarily processed content that includes the present-status use right including a condition equal to a condition included in the obtained secondary processing present-status use right, the adaptation right including a condition equal to a condition included in the obtained secondary processing adaptation right, the secondary processing present-status use right including a condition equal to a condition included in the obtained secondary processing present-status use right, and the secondary processing adaptation right including a condition equal to a condition included in the obtained secondary processing adaptation right; and accepting selection of a desired rights expression by a user from the rights expressions of the default license information to generate license information of the secondarily processed content from the selected rights expression.

7. A computer program product for generating copyright information for a secondarily processed content obtained by performing secondary processing on an original content, having a computer readable medium including programmed instructions, wherein the instructions, when executed by a computer, cause the computer to perform:
  acquiring an adaptation right that determines a rights expression of a secondary processing operation for the original content, from license information of the original content, the license information of the original content including a present-status use right that determines a rights expression of an operation for the original content, the adaptation right, a secondary processing present-status use right that determines a rights expression of an operation for the secondarily processed content, and a secondary processing adaptation right that determines a rights expression of a secondary processing operation for the secondarily processed content;
  acquiring operations designated by a user from the rights expression of secondary processing determined by the adaptation right;
  obtaining the secondary processing present-status use right and the secondary processing adaptation right for the acquired operation generating default license information of the secondarily processed content that includes the present-status use right including a condition equal to a condition included in the obtained secondary processing present-status use right, the adaptation right including a condition equal to a condition included in the obtained secondary processing adaptation right the secondary processing present-status use right including a condition equal to a condition included in the obtained secondary processing present-status use right and the secondary processing adaptation right including a condition equal to a condition included in the obtained secondary processing adaptation right; and
  accepting selection of a desired rights expression by a user from the rights expressions of the default license information to generate license information of the secondarily processed content from the selected rights expression.

8. An apparatus for generating copyright information for a secondarily processed content obtained by performing secondary processing on an original content, comprising:
  a secondary processed substance acquiring unit that acquires an adaptation right that determines a rights expression of a secondary processing operation for the original content, from license information of the original content, and that acquires operations designated by a user from the rights expression of secondary processing determined by the adaptation right acquired, the license information of the original content including a present-status use right that determines a rights expression of an operation for the original content, the adaptation right, a secondary processing present-status use right that determines a rights expression of an operation for the secondarily processed content and that includes a condition equal to a condition included in the present-status use right, and a secondary processing adaptation right that determines a rights expression of a secondary processing operation for the secondarily processed content and that includes a condition equal to a condition included in the adaptation right; and a default license information generating unit that obtains the secondary processing present-status use right and the secondary processing adaptation right for the operation acquired by the secondary processed substance acquiring unit, and generates default license information of the secondarily processed content that includes the present-status use right including a condition equal to a condition included in the obtained secondary processing present-status use right, the adaptation right including a condition equal to a condition included in the obtained secondary processing adaptation right, the secondary processing present-status use right including a condition equal to a condition included in the obtained secondary processing present-status use right, and the secondary processing adaptation right including a condition equal to a condition included in the obtained secondary processing adaptation right.

9. The apparatus according to claim 8, further comprising:
  a license information editing unit that accepts an editing of the default license information by a user to generate license information of the secondarily processed content; and
  a license information deciding unit that decides whether a condition included in the present-status use right is equal to a condition included in the secondary processing present-status use right, and a condition included in the adaptation right of the license information of the secondarily processed content is equal to a condition included in the secondary processing adaptation right, wherein
  the license information editing unit, when determined by the license information deciding unit that the condition included in the present-status use right is not equal to the condition included in the secondary processing present-status use right, or the condition included in the adaptation right of the license information of the secondarily processed content is not equal to the condition included in the secondary processing adaptation right, accepts an editing of the default license information by a user again to generate the license information of the secondarily processed content.

10. The apparatus according to claim 9, wherein the license information editing unit, when determined by the license information deciding unit that the condition included in the present-status use right is equal to the condition included in the secondary processing present-status use right, and the condition included in the adaptation right of the license information of the secondarily processed content is equal to the condition included in the secondary processing adaptation right, does not accept an editing of the default license information by a user to generate the license information of the secondarily processed content.

11. A method of generating copyright information for a secondarily processed content obtained by performing secondary processing on an original content, comprising:
  acquiring an adaptation right that determines a rights expression of a secondary processing operation for the original content, from license information of the original content, the license information of the original content including a present-status use right that determines a rights expression of an operation for the original content, the adaptation right, a secondary processing present-status use right that determines a rights expression of an operation for the secondarily processed content and that includes a condition equal to a condition included in the present-status use right, and a secondary processing adaptation right that determines a rights expression of a secondary processing operation for the secondarily processed content and that includes a condition equal to a condition included in the adaptation right;

acquiring operations designated by a user from the rights expression of secondary processing determined by the adaptation right acquired;

obtaining the secondary processing present-status use right and the secondary processing adaptation right for the acquired operation; and generating default license information of the secondarily processed content that includes the present-status use right including a condition equal to a condition included in the obtained secondary processing present-status use right, the adaptation right including a condition equal to a condition included in the obtained secondary processing adaptation right, the secondary processing present-status use right including a condition equal to a condition included in the obtained secondary processing present-status use right, and the secondary processing adaptation right including a condition equal to a condition included in the obtained secondary processing adaptation right.

12. A computer program product for generating copyright information for a secondarily processed content obtained by performing secondary processing on an original content, having a computer readable medium including programmed instructions, wherein the instructions, when executed by a computer, cause the computer to perform:

acquiring an adaptation right that determines a rights expression of a secondary processing operation for the original content, from license information of the original content, the license information of the original content including a present-status use right that determines a rights expression of an operation for the original content, the adaptation right, a secondary processing present-status use right that determines a rights expression of an operation for the secondarily processed content and that includes a condition equal to a condition included in the present-status use right, and a secondary processing adaptation right that determines a rights expression of a secondary processing operation for the secondarily processed content and that includes a condition equal to a condition included in the adaptation right;

acquiring operations designated by a user, from the rights expression of secondary processing determined by the adaptation right acquired;

obtaining the secondary processing present-status use right and the secondary processing adaptation right for the acquired operation; and generating default license information of the secondarily processed content that includes the present-status use right including a condition equal to a condition included in the obtained secondary processing present-status use right, the adaptation right including a condition equal to a condition included in the obtained secondary processing adaptation right, the secondary processing present-status use right including a condition equal to a condition included in the obtained secondary processing present-status use right, and the secondary processing adaptation right including a condition equal to a condition included in the obtained secondary processing adaptation right.

* * * * *